H. C. FOSTER.
LAMP CONSTRUCTION.
APPLICATION FILED MAR. 13, 1920.
1,373,878.
Patented Apr. 5, 1921.
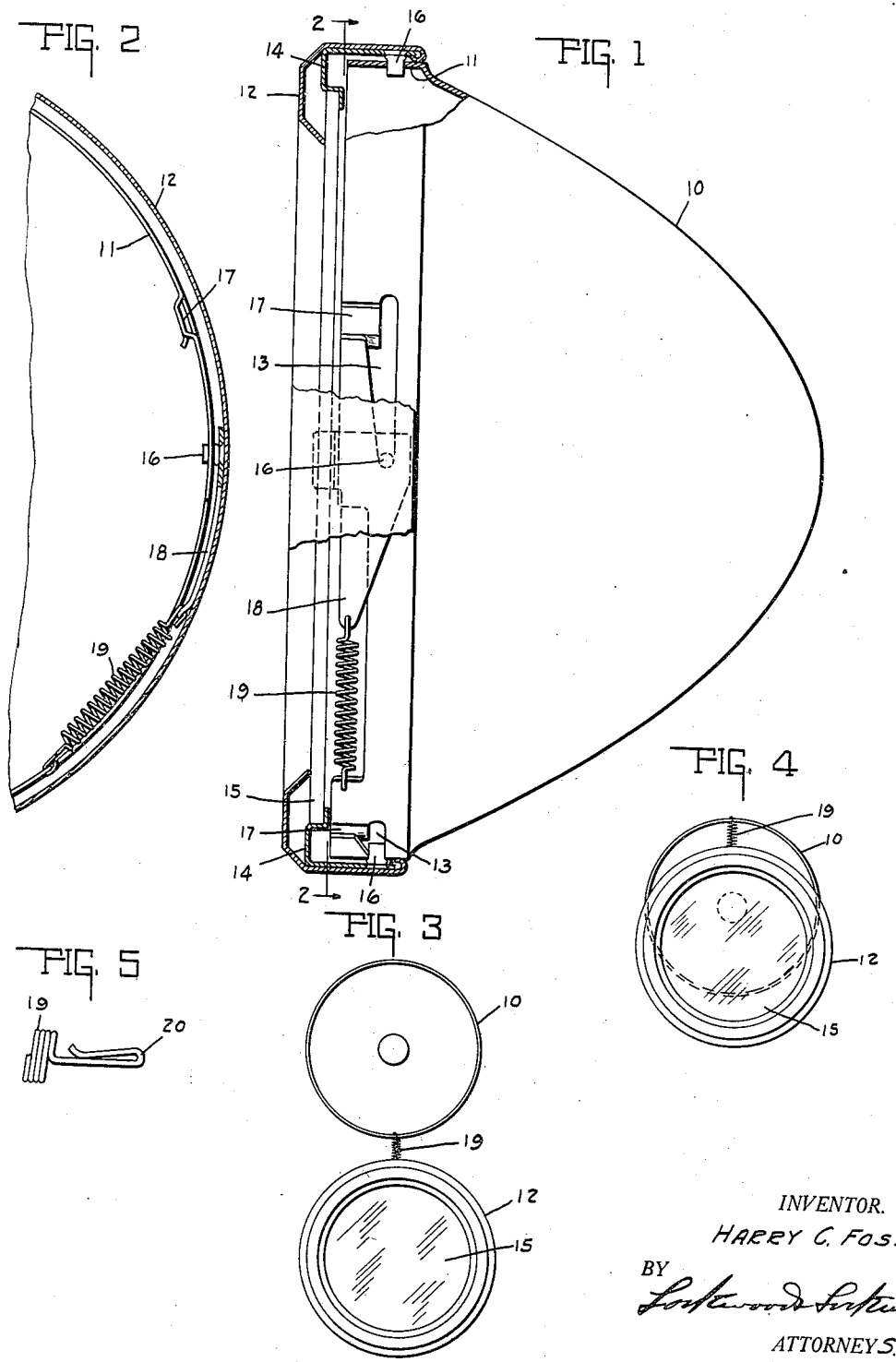
INVENTOR.
HARRY C. FOSTER
BY
ATTORNEYS.

UNITED STATES PATENT OFFICE.

HARRY C. FOSTER, OF CONNERSVILLE, INDIANA, ASSIGNOR TO INDIANA LAMP COMPANY, OF CONNERSVILLE, INDIANA.

LAMP CONSTRUCTION.

1,373,878.  Specification of Letters Patent.  Patented Apr. 5, 1921.

Application filed March 13, 1920. Serial No. 365,501.

*To all whom it may concern:*

Be it known that I, HARRY C. FOSTER, a citizen of the United States, and a resident of Connersville, county of Fayette, and State of Indiana, have invented a certain new and useful Lamp Construction; and I do hereby declare that the following is a full, clear, and exact description thereof, reference being had to the accompanying drawings, in which like numerals refer to like parts.

This invention relates to a lamp construction primarily adapted for headlights for automobiles and similar vehicles, and more specifically to the method of mounting and securing the lens rim to the casing thereof.

The main object of the invention is to provide a method of removably securing the lens rim to the casing by means of the slot and bolt method, retaining the rim in position by a spring means whereby all fastenings, clamps and the like are eliminated.

Another feature of the invention is the means for preventing the loss of the lens rim should it jar loose, said means at the same time positively acting for holding the rim in its locked position, whereby the jar of the car will tighten the rim rather than cause it to jar loose from the casing.

The full nature of this invention will be understood from the accompanying drawings and the following description and claims.

In the drawings Figure 1 is a side elevation of the lamp casing showing a portion thereof in cross section. Fig. 2 is a cross section taken on the line 2—2 of Fig. 1. Fig. 3 shows a lens rim removed from the casing and suspended therefrom. Fig. 4 shows the lens rim removed from the casing and suspended therefrom in another position. Fig. 5 shows a modified form of the spring attachment.

In the drawings there is shown a lamp casing 10 having a flange 11 about the forward periphery thereof, upon which the lens rim 12 is adapted to be secured. The flange 11 is provided with peripherally extending slots 13.

The lens rim 12 is formed with an inner clamping rim 14 adapted to clamp or secure the lens 15 in the rim 12. Said rim is provided with a plurality of radially and inwardly extending lugs 16 positioned at proper intervals so as to engage in the opening 17 of the slots 13. A plate 18 is rigidly secured by sweating or welding to the inner periphery of the rims 12 and 14, lying adjacent thereto and extending peripherally thereto in position to be yieldingly secured to the flange 11 by the tension spring 19.

The spring 19 is hooked at one end to the plate 18 and at the other end to the flange 11. This spring may either be fastened permanently to these parts, or formed with an elongated hook 20, as shown in Fig. 5, so as to be removable therefrom.

The spring 19, being already secured to the rim and the casing, the rim is placed in position on the forward face of the casing in the usual manner so that the lugs 16 will engage their respective openings and slots 17 and 13. In order to hold the rim in this position force must be exerted to overcome the tension of the spring 19, and immediately upon the rim being pushed rearwardly on the casing, the lugs passing into the slots 13, the spring will cause the rim to turn into the position shown in Fig. 1. The tension of the spring will, therefore, hold the rim in its locked position until overcome by manual operation to turn the lugs in registry with the openings 17, whereby they may be removed from their respective slots. Should the lens rim in any manner become unfastened and fall from the lamp casing, as often happens on lamps as now constructed, and particularly cheaply made lamps, it will simply fall into a hanging position as shown in Figs. 3 and 4, rather than to the ground and become damaged.

The invention claimed is:

1. In a lamp construction the combination with a casing, and a lens rim adapted to be securely fastened over the face of said casing, of yielding means for normally maintaining said rim in locked position and permanently tying it to said casing after its removal therefrom.

2. In a lamp construction the combination with a casing, and a lens rim adapted to be securely fastened over the face of said casing, a tension spring secured to said rim and casing for connecting them together and preventing the loss of the rim therefrom, and adapted to normally maintain said rim in its locked position on said casing.

3. A locking means for the lens rim of a lamp, including a casing member, a lens rim member adapted to fit upon said casing member, one of said members having an elongated slot therein with an opening at one end thereof, a lug on the other member in position to enter said opening and pass into said slot when the rim member is turned in locking position, and a tension spring having one end secured to said casing member and the other end to said rim member for yieldingly retaining said rim member in locked position and permitting its removal therefrom.

In witness whereof, I have hereunto affixed my signature.

HARRY C. FOSTER.